(12) United States Patent
Morris et al.

(10) Patent No.: US 9,043,935 B2
(45) Date of Patent: May 26, 2015

(54) TECHNIQUES FOR PERSONALIZING CONTENT

(75) Inventors: Cameron Craig Morris, Saratoga Springs, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 1343 days.

(21) Appl. No.: 11/750,778

(22) Filed: May 18, 2007

(65) Prior Publication Data

US 2008/0289049 A1    Nov. 20, 2008

(51) Int. Cl.
| | |
|---|---|
| G06F 21/00 | (2013.01) |
| G06F 21/62 | (2013.01) |
| G06F 21/10 | (2013.01) |
| G06F 17/30 | (2006.01) |

(52) U.S. Cl.
CPC ............ G06F 21/6218 (2013.01); G06F 21/10 (2013.01); G06F 17/30867 (2013.01)

(58) Field of Classification Search
CPC ................................ G06F 21/10; G06F 21/128
USPC ............ 709/224; 726/1, 2, 4, 28, 29; 713/153
See application file for complete search history.

(56) References Cited

U.S. PATENT DOCUMENTS

| | | | |
|---|---|---|---|
| 6,654,814 B1 * | 11/2003 | Britton et al. ................ 709/246 |
| 6,772,214 B1 | 8/2004 | McClain et al. | |
| 6,986,047 B2 * | 1/2006 | Giles et al. ................... 713/175 |
| 7,464,381 B1 * | 12/2008 | Nickerson et al. ............ 719/311 |
| 2002/0091798 A1 * | 7/2002 | Joshi et al. .................... 709/219 |
| 2002/0145622 A1 | 10/2002 | Kauffman et al. | |
| 2003/0061386 A1 * | 3/2003 | Brown et al. ................. 709/246 |
| 2003/0088639 A1 | 5/2003 | Lentini et al. | |
| 2004/0148408 A1 | 7/2004 | Nadarajah | |
| 2004/0205149 A1 | 10/2004 | Dillon et al. | |
| 2005/0021796 A1 | 1/2005 | McClain et al. | |
| 2005/0108517 A1 | 5/2005 | Dillon et al. | |
| 2007/0180147 A1 * | 8/2007 | Leigh ............................. 709/246 |
| 2008/0072249 A1 * | 3/2008 | Hovnanian et al. ............ 725/34 |
| 2008/0228911 A1 * | 9/2008 | Mackey ........................ 709/224 |
| 2009/0313114 A1 * | 12/2009 | Arampatzis ................ 705/14.45 |

OTHER PUBLICATIONS

Author: Paul Maglio; Tittle: Intermediaries Personalize Information Streams; Date: Aug. 2000; Communications of The ACM; vol. 43, No. 8.*

* cited by examiner

*Primary Examiner* — Jeffrey Pwu
*Assistant Examiner* — Thong Truong
(74) *Attorney, Agent, or Firm* — Schwegman Lundberg & Woessner, P.A.

(57) ABSTRACT

Techniques for personalizing content are presented. A principal requests access to content. Policy is evaluated in response to the request for the content. Scripts are processed in response to the policy evaluation to rewrite and modify the content. The modified content is then delivered to the requesting principal to personalize the content for the principal.

21 Claims, 3 Drawing Sheets

TECHNIQUES FOR PERSONALIZING CONTENT

FIELD

The invention relates generally to data processing and more particularly to techniques for personalizing content.

BACKGROUND

Increasingly, enterprises and end-users have a need to access data from a variety of locations using a variety of devices. The physical location of the data and the users has become irrelevant in today's highly connected environment and with the advent and pervasiveness of the World-Wide Web (WWW). The challenge for content providers has now become how that data can be customized for particular devices and particular users.

Generally, devices accessed by the user, such as cell phones, laptops, personal digital assistants (PDA's), etc. now come equipped with specialized or custom applications and browsers that permit data delivery in an optimal manner to specific devices. This is necessary because of font sizes of data and screen sizes that certain devices may or may not support or because of data rendering services that may or may not be accessible on some devices.

Typically, this custom data rendering is provided on a user-independent basis. This means that some WWW sites are designed to detect a generic device type that is requesting data and then reroute such a device to a parallel site that supports that device or that renders the data in a custom fashion for the specific device requesting the data. These solutions are not really tailored to the user but rather are tailored to the device where the data is being delivered to.

Moreover, with various versions of software rendering services, various devices, and various configurations for those devices, content providers are finding it difficult to keep up with the demand and their support staff and expenses have proliferated when providing device specific data delivery services.

Additionally, solutions that are geared toward user customization require applets to be embedded and installed within a user's WWW browser. These solutions require the user to be accessing a specific browser, which is usually configured on a specific device. This approach can customize data to the liking of the user but it relinquishes control to the user's environment, such that the user can modify or alter it, which may not always be advantageous or desired by the content provider. Furthermore, this technique is also not portable, which means that it is really tied to a specific processing environment or a specific device of a user; so, when the user attempts to access the Internet from a non-user machine or alternative environment the applets are not available at all to the user to customize data delivery.

Thus, what is needed is a mechanism, which allows for improved customized and personalized data delivery.

SUMMARY

In various embodiments, techniques for personalizing content are provided. More specifically, and in an embodiment, a method is presented for personalizing content delivered to a principal. A request for content is received from a principal; the principal is associated with a client processing environment and the request is received over a network connection. Next, an identity of the principal is confirmed and a content delivery policy is evaluated in response to the confirmed identity for the principal. Finally, the content is modified in response to the policy evaluation and the modified content is delivered to the principal within the client processing environment.

DETAILED DESCRIPTION

Figure 1:
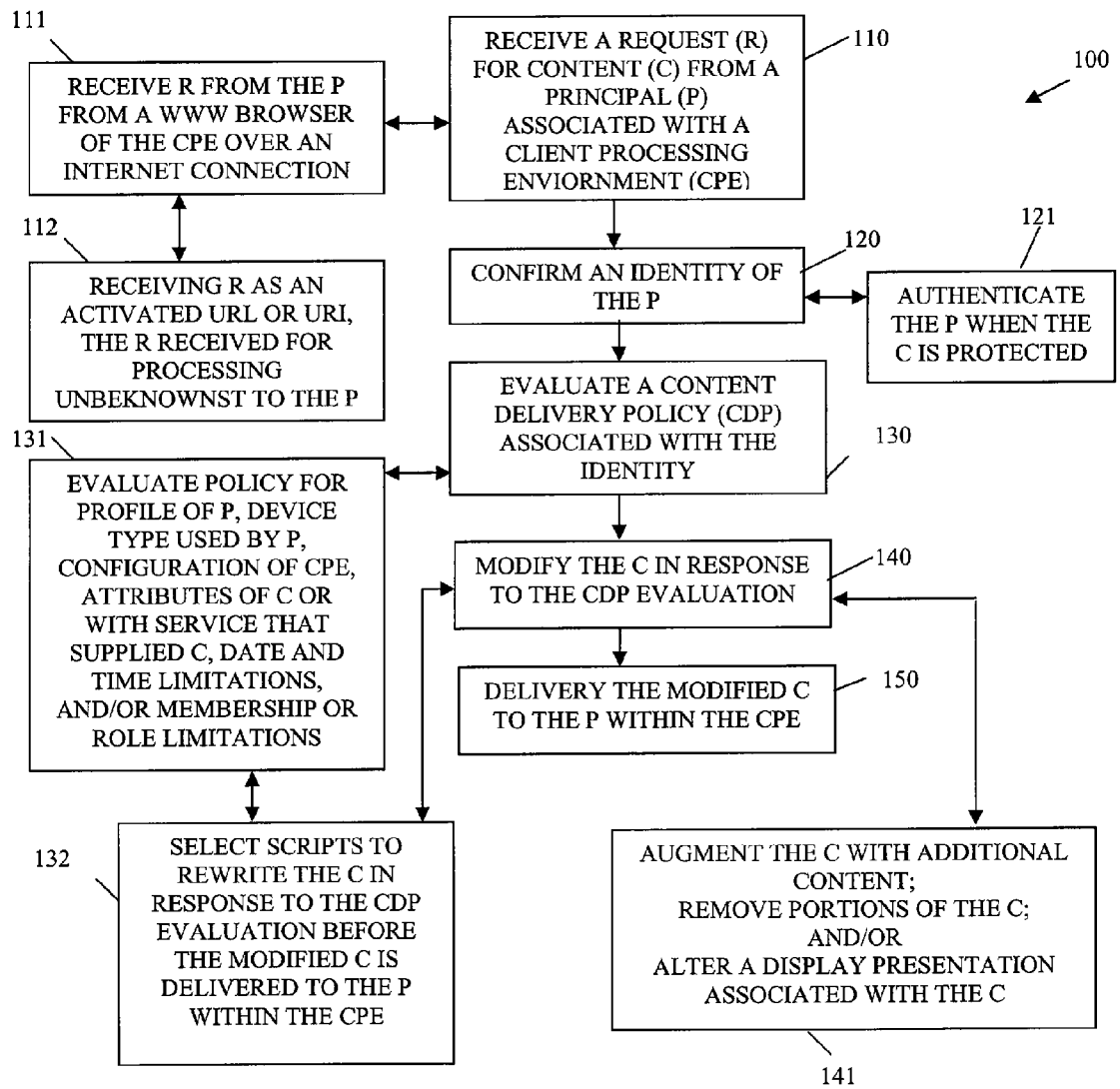
FIG. 1 is a diagram of a method for personalizing content delivered to a principal, according to an example embodiment.

A "resource" includes a user, content, a processing device, a node, a service, an application, a system, a principal, a directory, a data store, groups of users, combinations of these things, etc. A "principal" is a type of resource that engages in a communication session with one or more other resources for purposes of gaining access to those resources, such as acquiring access to content. The resources that the principal seeks to access may also have their own and sub resources. In an embodiment, a "principal" may be viewed as a user or as an automated application or service. The terms "service" and "application" may be used interchangeably herein and refer to a type of software resource that includes instructions, which when executed by a machine performs operations that change the state of the machine and that may produce output to drive the processing of other machines or resources.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given communication session, etc.).

An identity for a principal is at least partially resolved via an authentication technique in which the principal supplies or is identified by a single identifier and one or more authentication secrets (e.g., passwords, biometric data, digital signatures, digital certificates, etc.).

An "identifier" may be viewed as a principal name or principal ID that the principal may assume for any given context. In an embodiment, a principal has a single identifier and multiple authentication secrets that can be used with that single identifier. In another embodiment, the principal has multiple identifiers, and any given identifier can be used with each of the principal's available authentication secrets.

The principal's identity for any given context is resolved by authentication techniques that engage an identity service. The identity service uses a single supplied identifier and one or more of multiple available authentication secrets to resolve a particular identity for the principal in a given context.

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

An "identity service" refers to a special type of service that is designed to manage and supply authentication services and authentication information for resources. So, an identity service may authenticate a given principal for access to a variety of local and external resources known to that identity service. In addition the identity service itself may be viewed as a type of resource. In this manner, identity service may authenticate and establish trust with one another viewing one another as specific type of resource. An identity service may also enlist the assistance of other resources or services to perform any given authentication on a principal.

According to an embodiment, some example identity services, which may be used with the teachings presented herein, are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are all incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

For any particular resolved identity, a variety of other attributes may be assigned by the identity service or other services or resources that the identity service uses. That is, when the principal desires access to a resource or engages in a communication session with that resource, the access or session may require or may beneficially utilize other information beyond just the identity associated with the principal. Some example attributes or attribute types may include, by way of example only and not by way of limitation, a role that may define access rights and permissions, an employee number, an address, a phone number, a credit card number, income, social security number, etc.

Policy may drive in any given context and for any given identity what attributes are made available for a given access or communication session of the principal with a given resource. Moreover, a single principal may have the same type of attributes, such that a given type is selected depending upon the context. For example, a principal may have multiple addresses or phone numbers, where any given address or phone number is set depending on the context detected and the policy applied.

A "proxy" as used herein may be a special type of resource that acts on behalf of other resources, such as principals, content, content distributors, content providers, etc. A proxy may be dedicated on its own machine within a network to process or may share a machine on which it processes with other resources. As will be demonstrated below, a proxy may be transparent in which case it is located or accessible from a processing environment of a principal and intercepts communications emanating from the principal unbeknownst to that principal. A proxy may also be a forward proxy in which case it is located or accessible from a processing environment of the principal but the principal or its resources are preconfigured to know about and directly communicate with the forward proxy. Additionally, the proxy may be a reverse proxy in which case it is located outside a processing environment of the principal and is within an environment or accessible to an environment of a content provider or distributor and acts on behalf of the content provider in a fashion that is unknown to the principal and may in some cases be unknown to the content provider.

"Content" refers to information, such as text, audio, graphics, video, scripts, programs, images, etc. that is requested and desired by a principal over a network connection, such as the Internet. In an embodiment, content represents a World-Wide Web (WWW) page provided by a WWW site via a content distributor or provider. The content may include primary data such as the text, audio, etc. and may also include presentation details embodied in secondary or metadata about the primary data, such as bolding, page placement, effects, fonts, etc.

Various embodiments of this invention can be implemented in existing network architectures, security systems, data centers, and/or communication devices. For example, in some embodiments, the techniques presented herein are implemented in whole or in part in the Novell® proxy server products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for personalizing content delivered to a principal, according to an example embodiment. The method 100 (hereinafter "content modifying service") is implemented as instructions in a machine-accessible and readable medium. The instructions when executed by a machine perform the processing depicted in FIG. 1. The content modifying service is also operational over and processes within a network. The network may be wired, wireless, or a combination of wired and wireless.

Initially, the content modifying service may be processed and configured to process as a reverse proxy within an environment associated with the content distributor or provider. Alternatively, the content modifying service may be processed and configured to process as a transparent or forward process within an environment associated with a requesting principal. The principal is requesting content from the content distributor or provider over a network connection, such as the Internet. Thus, the content modifying service and its features may be tailored for an entire content provider or sets of content providers or tailored for a particular principal or set of principals independent of the any specific content provider (s).

At 110, the content modifying service receives a request for content from a principal associated with a client processing environment. The request is received over a network connection, such as a WAN (e.g., Internet, etc.) or even LAN (e.g., within a firewall environment, etc.).

According to an embodiment, at 111, the request is received from the principal from a World-Wide Web (WWW)

browser associated with and processing within the client processing environment of the principal. The request is received over an Internet connection. At 112, the request is received as a result of the principal activating a uniform resource locator (URL) or identifier (URI) link within the WWW browser or by the principal manually supplying the URL or URI to the browser address bar. The fact that the principal's request is received and is being processed by the content modifying service is unbeknownst to the principal and the client processing environment. This scenario can occur when the content modifying service is configured to process as a reverse proxy.

At 120, the content modifying service confirms an identity of the principal. This can be done in a number of ways, such as via a cookie value supplied from a WWW browser on behalf of the principal to the content modifying service. The principal may already be authenticated and in a secure session with the content modifying service or with a particular content provider where the content is being requested from. In some cases, at 121, additional security may be used, such that the principal is actually authenticated to a particular identity. This latter scenario may occur when the content is a protected resource requiring authentication. The content modifying service may perform the authentication itself or may enlist the services of a third-party service to perform the authentication, such as an identity service (examples of which were described and incorporated by reference above).

Once the identity for the principal is confirmed and optionally authenticated, at 130, the content modifying service acquires and evaluates a content delivery policy associated with the identity. In other words, the content delivery is identity-based or driven. This is achieved by associating policy for identities associated with principals. The identity resolution determines which policies are selected for evaluation. In this way, and as is described in greater detail herein and below, content delivery can be customized and tailored to identities of principals permitting content to be personalized.

In an embodiment, at 131, the policy may be evaluated for a variety of criteria or limitations customized for a particular principal's identity and to other factors. For example, policy may be defined or customized for a given profile of the principal; a specific device type being used by the principal when the request was received; a specific configuration of the client processing environment associated with the principal, such as software services installed, versions of the services, device types, etc.; attributes associated with the content as assigned by a content provider or attributes of a service that distributes the content on behalf of the provider; date and time limitations as to when and how the content is to be delivered; geographic limitations; spoken language limitations (e.g., English versus Spanish, etc.); and/or membership or role limitations that the principal may belong to or actively associated with when the request is received.

In some cases, at 132, the actual modification of the content (described more completely with 140 below) is achieved by selecting scripts to process and rewrite the content in response to the content delivery policy evaluation before the modified content is delivered to the principal within the client processing environment. In other words, the content modifying service may enlist or use custom-developed and supplied processing scripts to achieve the desired personalization and customization of the content in response to how the policy evaluation was resolved. It is noted that multiple levels of policies may be evaluated and used and that the levels may be hierarchical in nature in some instances.

At 140, and once the policy is evaluated in response to the resolved and confirmed identity of the requesting principal, the content modifying service proceeds to modify the content. This assumes that the content modifying service has acquired the content from the content provider on behalf of the principal or that the content modifying service intercepts the content delivered from the content provider to the principal before the principal can view or access the content. This action produces modified content that is customized and personalized for the requesting principal.

At 141, the content modifying service can produce the modified content in a number of manners. For example, the original requested content may be augmented with additional content, such as advertisements, graphics, etc. Still further, the original requested content may have some portions of the original content removed, such as video, advertisements, etc. In still other situations, the original content may not have its primary content altered at all; rather, the display presentation of the primary content is altered and presented in a customized or personalized manner with the modified content.

Once the modified content is produced, at 150, the content modifying service delivers or releases the modified content to the principal within the client processing environment. At this point, the principal may or may not be aware of the personalization and customization that was achieved on behalf of the principal; but the principal does not see or access the original requested content; rather, the modified content is provided to the principal. In other cases, the actual customization that the content modifying service achieved with the modified content may have been previously defined and provided by the principal, such that not only is the principal aware of it but in fact the principal controlled it.

Figure 2:
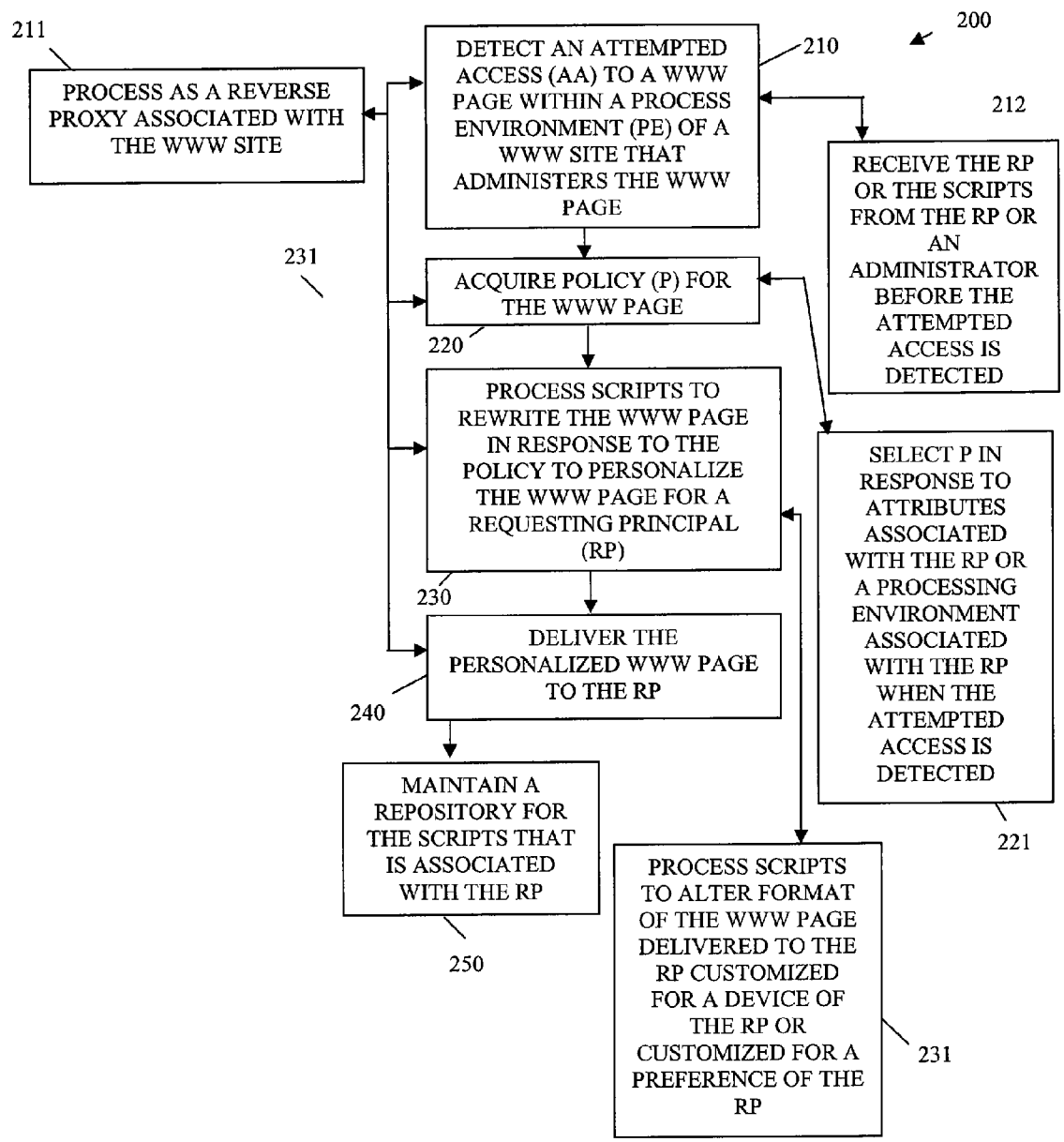
FIG. 2 is a diagram of another method for personalizing content delivered to a principal, according to an example embodiment.

FIG. 2 is a diagram of another method 200 for personalizing content delivered to a principal, according to an example embodiment. The method 200 (hereinafter "content personalization service" is implemented in a machine-accessible and readable medium as instructions. The instructions when executed by a machine perform the processing depicted in the FIG. 2. Moreover, the content personalization service is operational over a network, and the network may be wired, wireless, or a combination of wired and wireless. The processing associated with the content personalization service presents an alternative perspective and in some cases enhanced perspective to the processing associated with the content modifying service described above with the method 100 and within the context of the FIG. 1.

At 210, the content personalization service detects an attempted access to a particular WWW page associated with a particular WWW site. The WWW site administers the WWW page that a requesting principal desires access to.

In some cases, at 211, the content personalization service processes as a reverse proxy on behalf of the WWW site within an environment of the WWW site or within an environment that is accessible to the WWW site.

In other cases, as described with the method 100 of the FIG. 1, the content personalization service may process on behalf of the requesting principal as a transparent or even forward proxy service (not shown in FIG. 2 but described in detail above with reference to the FIG. 1).

In an embodiment, at 212 and as is described more completely below, the content personalization service may utilize scripts to perform the custom and personalized content modification before the content is actually provided to the requesting principal. These scripts can come from a variety of sources. For example, the scripts may have been previously supplied by the requesting principal or an administrator associated with the principal or even the WWW site from the WWW page that is being requested by the principal. Some scripts may be available off-the-shelf for purchase, deployment, and use by the content personalization service; while other scripts may be custom developed to meet a particular content rendering need or desire.

At 220, the content personalization service acquires policy for the WWW page. Acquisition of the initial policy that is evaluated is based on identity or is driven by limitations defined by the WWW site, in response to the WWW page being requested or in response, at 221, to attributes or configurations associated with the requesting principal, the requesting principal's device, the requesting principal's environment, etc. when the attempted access of the WWW page is detected.

At 230, the content personalization service identifies, acquires, and processes scripts to rewrite the requested WWW page in response to evaluation of the policy. Once the scripts have processed, the WWW page is modified in its content or its content presentation to achieve personalization of the WWW page for the requesting principal's subsequent consumption, access, and viewing.

Thus, in an embodiment, at 231, the scripts may be processed to alter the format of the original requested WWW page that is subsequently delivered to the requesting principal, such that the format is customized for a particular device that the requesting principal is using. The format may also be customized for a particular preference of the requesting principal.

At 240, and once the scripts have processed to customize and personalize the WWW page and its content and/or format presentation, the content personalization service delivers the personalized WWW page to the requesting principal. This can be done by delivering the personalized WWW page to the principal's WWW browser. The principal's WWW browser then displays the personalized WWW page on a display of a device that the principal is accessing.

In some embodiments, at 250, the content personalization service also maintains and manages a repository for the scripts that is associated with the requesting principal. So, a principal can externally maintain content personalization scripts at an external and remote location with the content personalization service that is independent of the principal's browser, a particular principal device, or a particular principal processing environment configuration. This makes the customization more portable and valuable to the principal.

Figure 3:
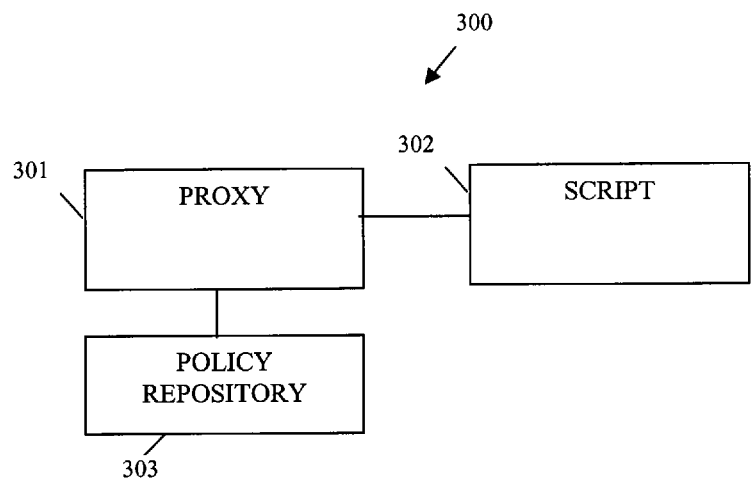
FIG. 3 is a diagram of a content personalization system, according to an example embodiment.

FIG. 3 is a diagram of a content personalization system 300, according to an example embodiment. The content personalization system 300 is implemented as instructions on or within a machine-accessible and readable medium. The instructions when executed by a machine perform processing depicted with respect to the methods 100 and 200 of the FIGS. 1 and 2, respectively. The content personalization system 300 is also operational over a network and the network may be wired, wireless, or a combination of wired and wireless. In some cases the network is the Internet or a wide-area network (WAN).

The content personalization system 300 includes a proxy 301 and a script 302. In some cases, the content personalization system 300 may also include a policy repository 303. Each of these will now be discussed in turn.

The proxy 301 is implemented in a machine-accessible and readable medium and is to process on a machine over a network connection, such as an Internet connection. The proxy 301 and its processing were described in detail above with reference to the methods 100 and 200 of the FIGS. 1 and 2.

Specifically, the proxy 301 is processed to intercept a request that is made for content, such as but not limited to a WWW page associated with a WWW site. The proxy 301 is also to evaluate policy acquired (which may be acquired from a policy repository 303 described below) for purposes of identifying one or more script 302. The proxy 301 acquires the content requested or intercepts it and evaluates the policy to determine the script 302 and to process the script 302. Once the script 302 (described below) processes the content is modified and personalized for a requesting principal, the modified content is then delivered by the proxy 301 to the requesting principal to a service or environment accessible to the requesting principal.

In an embodiment, the proxy 301 is a reverse proxy 301 located or accessible to an environment that administers the content. The proxy 301 is thus remote from an environment and/or device associated with the principal over a WAN connection, such as an Internet connection.

In a different embodiment, the proxy 301 is a transparent or a forward proxy 301 located within an environment or device associated with the principal and is remote from a different environment that is associated with administering the content being requested.

According to an embodiment, the proxy 301 also authenticates the principal for initial access to the content. This occurs when the content is a protected resource or where policy dictates authentication before the content can even be accessed. In such a situation, the authentication occurs before the policy is evaluated. It may also be that as part of the policy evaluation, the authentication is performed. In some cases, the proxy 301 may enlist third-party trusted services to perform the authentication of the principal, such as via an identity service (discussed and incorporated by reference above).

The proxy 301 may also process and exist in duplicate across a network. Thus, one instance of the proxy 301 may alter the content via the script 302 (described below) as a reverse proxy 301 on behalf of the content distributor or provider and another instance of the proxy 301 may further alter the already modified content as a transparent or forward proxy 301 on behalf of the requesting principal. Thus, multiple instances of the proxy 301 may be configured to interact and process with one another or in concert with one another, such that multiple layers of customization and personalization of the content can occur.

The script 302 is implemented in a machine-accessible and readable medium and is to process on a machine. The machine that the script 302 processes on may be the same machine that processes the proxy 301 or a different machine not associated with the proxy 301. The script 302 is invoked by the proxy 301 after and/or during, and in response to the policy evaluation performed by the proxy 301. The script 301 may be customized and/or supplied by an administrator, the requesting principal, and/or the content provider or distributor.

When the script 301 is processed it alters the primary content or the format and presentation details associated with the primary content via secondary content that is associated with the primary content. In an embodiment, the script 301 that alters the primary content may be a JAVA script. In other cases, the script 301 may be an extensible style sheet (XSL) transformation (XSLT) application for a given WWW page identified as the content. In other cases, the script 301 may be an executable application or applet that processes, transforms, and renders the content to different and modified primary content or presentation formats. The script 301 may be customized for a given principal or given piece of content; alternatively, the script 301 may be an off-the-shelf application or XSL that is identified and processed for the content to customize and personalize the content on behalf of requesting principal.

It is also noted that more than one script 301 may be processed against the same requested content. Additionally, the multiple scripts 301 may have a defined processing order within which any particular script 301 is executed. So, the output of modified content for one script 301 may be used as the input of modified content for another script 301.

According to an embodiment, the content personalization system 300 may also includes a policy repository 303. The policy repository 303 is implemented within a machine-accessible and readable medium and is accessible to machines and services of the machines over a network connection, such as an Internet connection.

The policy repository 303 is used by the proxy 301 to manage and house policy used for the requesting principal, other requesting principals, and/or a content distributor or provider associated with the content. In this manner, a single proxy 301 and policy repository 303 can be used to manage and personalize content for a plurality of content providers, principals, and/or content distributors. Any particular policy or set of policies may be retrieved from the policy repository 303 using a variety of criteria such as identities associated with the principal, content, content distributors, content providers, etc.

The policy can define a variety of limitations that can be used to identify, acquire, and process the script 301. Some examples include, but are not limited to, attributes associated with a principal (such as identity), attributes associated with devices that the principal may use, preferences associated with the principal (such as profiles), attributes associated with the content, attributes associated with configurations of processing environments that the principal may use, time and date limitations associated with the content or content provider, and/or membership or role limitations assigned to the principal.

Figure 4:
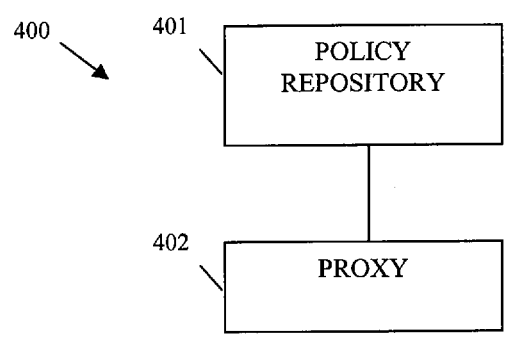
FIG. 4 is a diagram of another content personalization system, according to an example embodiment.

FIG. 4 is a diagram of another content personalization system 400, according to an example embodiment. The content personalization system 400 is implemented as instructions on or within a machine-accessible and readable medium. The instructions when executed by a machine also perform, among other things; the processing depicted with respect to the methods 100 and 200 of the FIGS. 1 and 2, respectively. The content personalization system 400 is also operational over a network and the network may be wired, wireless, or a combination of wired and wireless. The content personalization system 400 presents a different perspective to the content personalization system 300 described above with reference to the FIG. 3.

The content personalization system 400 includes a policy repository 401 and a proxy 402. Each of these will now be discussed in turn.

The policy repository 401 is implemented in machine-accessible and readable medium and is accessible to a machine and services that process on the machine or other machines of a network. Example usages of the policy repository 401 were described above with reference to the policy repository 303 of the FIG. 3.

The policy repository 401 supplies and houses policy for the proxy 402. The policy defines limitations or actions for a given set of circumstances that the proxy 402 is to take for a given request for a particular WWW page for a particular WWW site and a particular requesting principal.

In an embodiment, at least some of the policy housed in the policy repository 401 may be done by requesting principals, administrators associated with WWW pages (content), and/or content providers or distributors of content.

The policy repository 401 may also be used to house scripts that get processed against WWW pages in response to policy evaluation that is performed by the proxy 402. Thus, the policy repository 401 provides a centralized mechanism to manage policy and scripts for a plurality of requesting principals, WWW pages, WWW sites, content providers, content distributors, etc.

The policy repository 401 may be a directory, a distributed directory, a database, a collection of databases organized as a data warehouse, or various combinations of these things that cooperate with one another via a mutual Application Programming Interface (API). Access to the policy repository 401 may also be controlled by identity and global policy. In some cases, the policy repository 401 may sit behind a firewall and access may just be granted to a proxy 402 configured to process within that firewall.

The proxy 402 is implemented in a machine-accessible and readable medium and is to process on a machine over a network connection, such as an Internet connection. Example processing associated with the proxy 402 has been described in detail above with reference to the FIGS. 1-3.

The proxy 402 is processed to acquire policy from the policy repository 401 for requested WWW pages. The proxy 402 evaluates the policy for purposes of modifying the WWW pages and to thusly personalize the WWW pages for delivery to requesting principals for their subsequent viewing and access. Again, the policy evaluation may drive the proxy 402 to acquire and process scripts to achieve personalization of the WWW pages.

In an embodiment, the proxy 402 is invoked for processing automatically and dynamically when requesting principals attempt to access the WWW pages initially over an Internet connection. In other instances, the proxy 402 is automatically and dynamically invoked for processing just before the WWW pages are delivered to the WWW browsers of the requesting principals.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method residing in a non-transitory machine readable medium and for processing on a proxy device, comprising:
receiving, by the proxy device, a request for content from a principal associated with a client processing environment, the request is received over a network connection;
confirming, by the proxy device, an identity for the principal and in response to confirming the identity acquiring a content delivery policy, wherein resolution of the identity for the principal determines the content delivery policy and multiple other hierarchical policies, and wherein the principal is already authenticated and is in a secure session with the method when the identity is resolved and when the request is received;

evaluating, by the proxy device, the content delivery policy and the multiple other hierarchical policies for the identity;

modifying, by the proxy device, the content based on evaluation of the content delivery policy and the multiple other hierarchical policies to customize and personalize the modified content based on the identity of the principal, wherein the content delivery policy and the multiple other hierarchical policies provide instruction for at least modifying the content by adding additional content to the content, and wherein modifying further includes selecting scripts to rewrite the content in response to the content delivery policy evaluation before the modified content is delivered to the principal within the client processing environment;

interacting, by the proxy device, with another instance of the proxy device that is a duplicate of the proxy device to further customize and personalize the modified content, the duplicate proxy device configured as a reverse proxy device to a content distributor to customize on behalf of the content distributor; and delivering, by the proxy device, the modified content to the principal within the client processing environment.

2. The method of claim 1, wherein receiving further includes, receiving the request from the principal from a World-Wide Web (WWW) browser of the client processing environment, and wherein the network connection is an Internet connection.

3. The method of claim 2, wherein receiving further includes receiving the request, which is an activated uniform resource locator (URL) or identifier (URI) link that is activated by the principal within the WWW browser, wherein the request is received for processing unbeknownst to the principal.

4. The method of claim 1, wherein confirming the identity of the principal further includes authenticating the principal for access to the content when the content is protected.

5. The method of claim 1, wherein evaluating further includes evaluating a policy associated with: attributes or a profile associated with the principal, a device type being used by the principal within the client processing environment, configuration associated with the client processing environment, attributes associated with the content or with a service that supplies the content, data and time limitations, and memberships limitations associated with a membership of the principal in a particular group or role.

6. The method of claim 1, wherein modifying further includes one or more of the following:
removing portions of the content to produce the modified content; and
altering a display presentation associated with the content to produce the modified content.

7. A method residing in a non-transitory machine-readable medium and for processing on a proxy device, comprising:
detecting, by the proxy device, attempted access to a World-Wide Web (WWW) page within a processing environment associated with a WWW site that administers the WWW page;
acquiring, by the proxy device, policy for the WWW page based on an identity for the principal;
processing, by the proxy device, scripts to rewrite the WWW page based on the policy and a global policy to personalize the WWW page for a requesting principal based on the identity, the scripts previously supplied by the WWW site associated with the WWW page to the proxy device, the proxy device operating as a reverse proxy device to the WWW site, and wherein processing further includes selecting the scripts to rewrite the WWW page in response to a content delivery policy evaluation before the rewritten WWW page content is delivered to the principal within a client;

interacting, by the proxy device, with another instance of the proxy device that is a duplicate of the proxy device to further personalize the WWW page for the requesting principal, the instance of the proxy device is a transparent proxy device to the client of the principal; and delivering, by the proxy device, the personalized WWW page to the requesting principal, the proxy device is a reverse proxy device that is remote from a processing environment of the principal over a network connection and is local to the WWW site.

8. The method of claim 7 further comprising:
receiving, by the proxy device, the policy from the requesting principal or an administrator before the attempted access is detected.

9. The method of claim 7 further comprising, maintaining, by the proxy device, a repository for the scripts, wherein the repository is associated with the requesting principal.

10. The method of claim 7, wherein acquiring further includes selecting the policy in response to attributes associated with the requesting principal or a processing environment associated with the requesting principal when the attempted access is detected.

11. The method of claim 7, wherein processing further includes processing the scripts to alter a format that the WWW page is delivered to the requesting principal in, wherein the format is customized to a particular device that the requesting principal is using when the attempted access is detected.

12. The method of claim 7, wherein processing further includes processing the scripts to alter a format that the WWW page is delivered to the requesting principal in, wherein the format is customized to a preference of the requesting principal.

13. A system, comprising:
a machine configured as a proxy device; and
the machine also configured with a script to process on the machine, the proxy device is to intercept a request for content submitted by a principal and is to evaluate policy to identify the script, and based on the policy evaluation the proxy device is to acquire the content and process the script, and the script is to modify the content and supply the modified content to the proxy device, and wherein the script is selected to rewrite the content in response to a content delivery policy evaluation before the modified content is delivered to principal within a processing environment of the principal, the proxy device then interacts with another instance of the proxy device that is a duplicate of the proxy device to further modify the content at which point the modified content is delivered to the principal, the policy is acquired based on an identity for the principal and the policy is evaluated along with a global policy to identify the script, the script previously supplied by a WWW site associated with the content to the proxy device and the script personalizes the content for the principal via the modified content and is driven based on the identity for the principal and the global policy, and the proxy device is a reverse proxy device that is remote from the processing environment of the principal over a network connection and the reverse proxy device operates within a local processing environment of a content distributor supplying the content and the instance of the proxy device is a transparent proxy to a client of the principal.

14. The system of claim 13 further comprising, a policy repository that houses policy for the principal, other principals, and the content distributor associated with the content.

15. The system of claim 13, wherein the policy includes one or more of the following: attributes associated with the principal, attributes associated with devices that the principal uses, preferences associated with the principal, attributes associated with the content, attributes associated with configurations of processing environments that the principal may use, time or date restrictions, and membership or role limitations assigned to the principal.

16. The system of claim 13, wherein the proxy is to further authenticate the principal when the content is a protected resource before the policy is evaluated.

17. A system, comprising:
a policy repository implemented in a machine-accessible medium and accessible on a machine; and
a machine configured as a proxy device, the proxy device is to acquire principal policies from the policy repository for requested World-Wide Web (WWW) pages based on identities for requesting principals and based on global policies and the proxy device is to evaluate the principal policies and global policies to modify and personalize the pages and the proxy device, the proxy device acting as a reverse proxy device for the requested WWW pages and the proxy device is to interact with another instance of the proxy device that is a duplicate of the proxy device to further modify and personalize the pages before the modified and personalized pages are delivered to the requesting principals for viewing, the instance of the proxy device acting as a transparent proxy device to clients of the principals, wherein the principals are already authenticated to the proxy device when the identities are resolved for the principals and when the personalized pages are requested by the requesting principals for viewing, and the modified and personalized pages include at least some additional content added in the pages as instructed by the principal policies, the principal policies are hierarchical, and wherein the personal pages are modified in response to a content delivery policy evaluation before the modified personal pages are delivered to the requesting principals within their client processing environment.

18. The system of claim 17, wherein at least some of the principal policies is to be updated to the policy repository by the requesting principals.

19. The system of claim 17, wherein at least some of the principal policies is to be updated to the policy repository by administrators associated with the WWW pages.

20. The system of claim 17, wherein the proxy device is invoked to process when the requesting principals attempt to access the WWW pages.

21. The system of claim 17, wherein the proxy device is invoked to process just before the WWW pages are delivered to the requesting principals.

* * * * *